July 9, 1957 W. L. WILSON 2,798,325
PARKING METER ATTACHMENT
Filed May 20, 1955 2 Sheets-Sheet 1
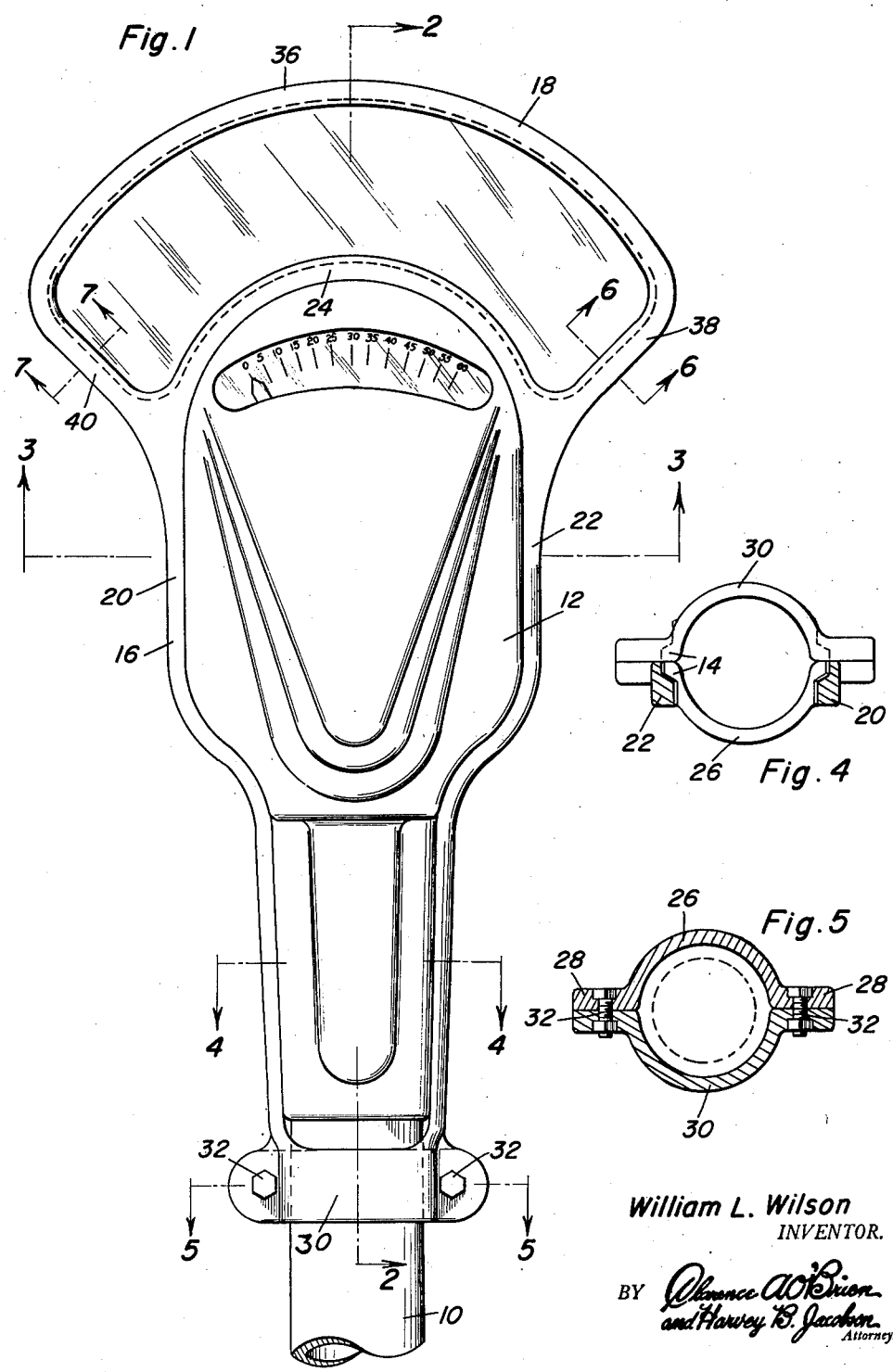
William L. Wilson
INVENTOR.

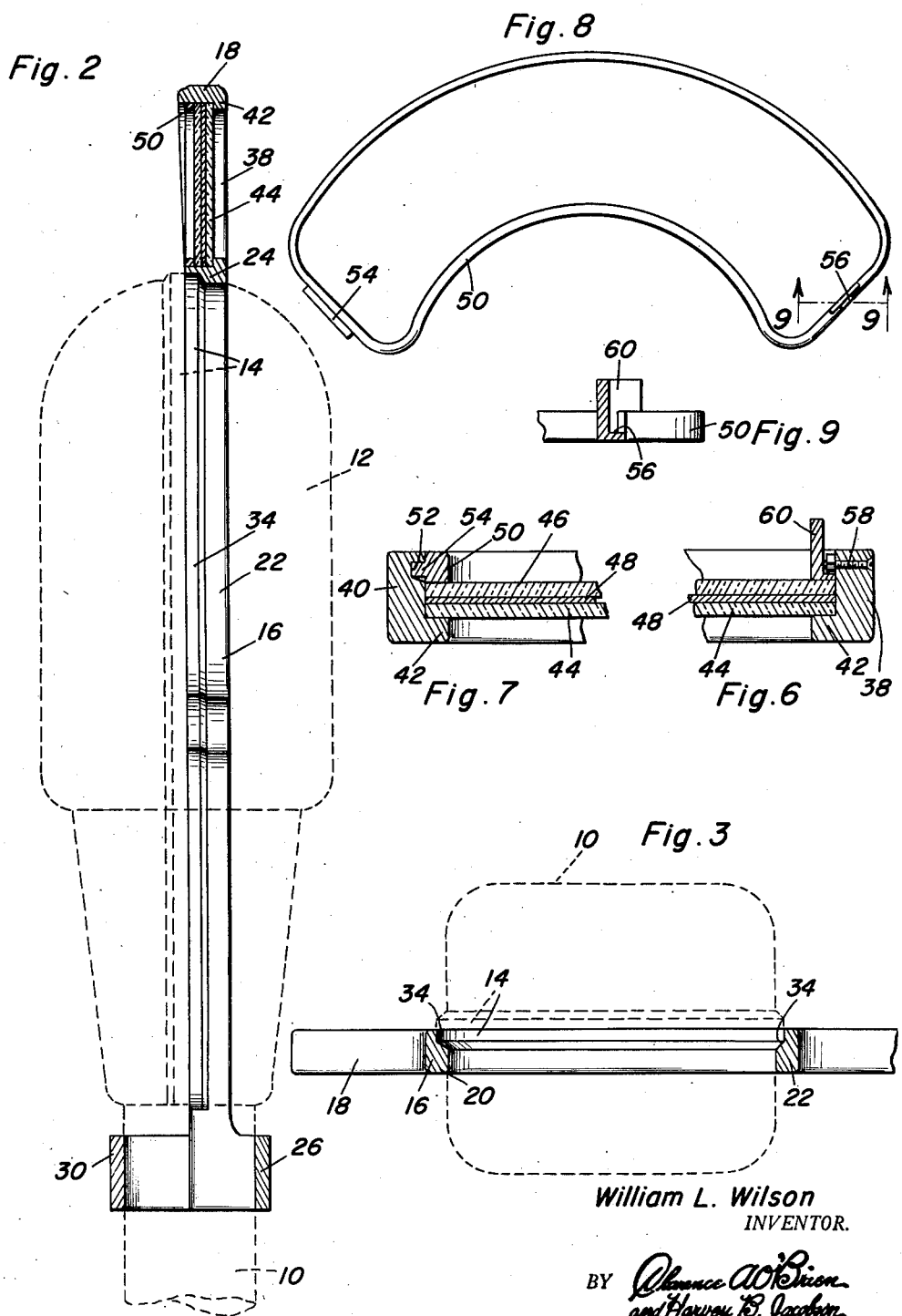

United States Patent Office 2,798,325
Patented July 9, 1957

2,798,325
PARKING METER ATTACHMENT

William L. Wilson, Yakima, Wash., assignor to Meter Advertising Company, Yakima, Wash.

Application May 20, 1955, Serial No. 509,779

4 Claims. (Cl. 40—145)

This invention comprises novel and useful improvements in a parking meter attachment and more specifically relates to a device adapted for mounting upon a parking meter in an improved manner and for supporting and displaying a sign or advertisement.

The principal object of this invention is to provide a parking meter attachment whereby an advertisement, sign or other material may be securely mounted upon and attractively displayed upon the top of a parking meter head.

A further object of the invention is to provide an attachment in accordance with the preceding object which shall be of an extremely simple construction and yet shall have a firm and secure attachment to and seating engagement with the structure of conventional parking meter heads.

Yet another object of the invention is to provide a display attachment in accordance with the foregoing objects wherein the means for mounting the attachment upon a parking meter head is especially constructed for cooperation with a conventional peripheral rib or flange formed on parking meters.

Yet another important object of the invention is to provide a display attachment in accordance with the above mentioned objects wherein the construction of the mounting means is simplified by applying the mounting means to one side only of the annular peripheral rib of a parking meter, and yet wherein a firm, rigid and secure attachment of the device to the parking meter is obtained without the necessity for providing attaching bolts or screws into the structure of the parking meter.

A still further important object of the invention is to provide a display attachment specifically adapted for use with parking meters and wherein the display carried by the attachment shall be attractively exhibited in conjunction with the parking meter head and without detracting from the appearance or utility of the same; and wherein the object displayed shall be curved in accordance with the contour of the top of the parking meter head in order to provide a maximum length of display space in conjunction therewith.

And a final important object of the invention to be specifically enumerated herein resides in the provision of a display attachment for parking meters wherein the attachment shall be of a simple, substantially one-piece construction, and shall rigidly and closely engage and seat upon a parking meter for secure attachment thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of a portion of a parking meter showing the upper portion of a parking meter post with a parking meter head thereon, and showing the attachment in accordance with this invention applied thereto;

Figure 2 is a vertical transverse sectional view taken substantially upon the plane indicated by the section line 2—2 of Figure 1, the attachment being shown in full lines and the parking meter post and parking meter head being shown in dotted lines therein;

Figure 3 is a horizontal sectional view taken substantially upon the plane indicated by the section line 3—3 of Figure 1 and showing the parking meter head in dotted lines therein;

Figure 4 is a horizontal sectional detail view taken substantially upon the plane indicated by the section line 4—4 of Figure 1, this view illustrating the manner in which the base portion of the attachment is seated upon the vertical side ribs of the parking meter head;

Figure 5 is a horizontal sectional view taken substantially upon the plane indicated by the section line 5—5 of Figure 1 and showing the clamping means by which the device is locked upon the parking meter;

Figure 6 is a detail view taken through the window frame of the parking meter attachment, substantially upon the plane indicated by the section line 6—6 of Figure 1 and showing the manner in which the retaining rim of the removable transparent pane of the window is locked to the casing of the frame;

Figure 7 is a detail view taken substantially upon the plane indicated by the section line 7—7 of Figure 1, and showing a further feature of the means whereby the retaining rim is detachably secured to the casing of the frame;

Figure 8 is an elevational view of the retaining rim by means of which the removable transparent pane of the window is detachably secured in the casing or frame of the window; and, Figure 9 is a detail view taken substantially upon the plane indicated by the section line 9—9 of Figure 8 and showing the finger grip portion of the retaining rim.

At the present time there are a number of known attachments whereby advertising matter or other displays may be mounted upon a parking meter. The present invention aims to improve such devices by providing a considerably simplified manner of applying and attaching such a device to a parking meter head in a much more attractive manner, and one in which the attachment is more securely and rigidly attached to the structure of the parking meter; together with improved means for removably supporting display cards in a transparent window structure forming a part of the display device.

In the accompanying drawings, a conventional form of parking meter construction is shown, the same having a supporting post 10 upon which is secured a conventional form of coin operated parking meter head 12. Most of the conventional types of parking meter heads are formed of two complementary casing members which are joined upon a vertical plane and at their plane of junction are provided with mating peripheral beads or ribs 14 which extends medially along their vertical edges and across their top edges, as will be best apparent from Figures 2, 3 and 4. It is to a parking meter head of this construction that the present invention is particularly adapted, the attachment forming the subject matter of this invention, the mounting means of the attachment being particularly designed to cooperate with this medial peripheral bead or rib for rigidly and securely seating the attachment upon the parking meter.

Referring first to Figure 1 it will be seen that the attachment according to this invention includes a unitary base member 16 having at its upper end a window frame or casing 18 adapted to display an advertisement or other matter, as set forth hereinafter.

Referring now particularly to Figures 2, 3 and 4, it will be seen that the base 16 comprises a frame or hollow casing having a pair of side edges 20 and 22 together with an integral top wall 24. Thus the body portion of the base is U-shaped for snugly conforming to and embracing the side and top of a meter head. From the side walls 20 and 22, the frame or casing 16 extends inwardly and downwardly as shown in Figure 1 to embrace the lower portion of the meter head, and at its bottom end, as shown best in Figures 2 and 5, terminates in a semi-cylindrical lower portion 26 having oppositely and laterally extending brackets or lugs 28. A semi-circular clamp 30 is provided complementary to the semi-cylindrical portion 26, and secured thereto as by bolts and nuts 32. The clamp and the semi-cylindrical portion are adapted to tightly embrace the meter post 10 and constitute the sole means for clamping the device to the parking meter.

Referring again to the body portion of the base, it will be seen from Figures 2 and 4 that the base 16 comprises a frame which in one face has a recess 34 therein for receiving and seating engagement upon the above mentioned peripheral ribs 14 upon the sides and top of the meter head. In some instances, it may be preferred to form the semi-cylindrical lower portion of the base at a slight angle with respect to the body portion; or to slightly curve the latter whereby the inherent resiliency of the material will cause the device to press tightly against the rib upon tightening of the clamping nuts 32. In any event, it is intended that the seating engagement of the ribs 14 and the recesses 34 together with the clamping bracket 30 shall rigidly and tightly secure the attachment to the parking meter head without rattling or lost motion therebetween.

Reference is now made particularly to Figures 2, 6, 7 and 9 for an understanding of the construction of the window frame 18 and the display assembly associated therewith. As previously mentioned, the window frame has its lower wall 24 closely conforming to the top surface of the parking meter head and as the latter is usually rounded, the bottom wall of the frame 24 is also similarly curved. The top wall 36 of the frame is spaced equidistantly from the bottom wall 24 thereof, and is integrally connected thereto as by end walls 38 and 40. It will thus be seen that the window opening is curved to closely conform to the contour of the top of the parking meter and thus provides a graceful and attractive extension therefrom.

As will be apparent from Figures 2, 6 and 7, the arcuately extending window frame has a pair of open faces, and one of these faces is provided with an inturned or inwardly extending rib or projection 42 upon which is seated a transparent pane 44. It is intended that this frame shall be usually permanently secured to the wall or rib 42 in any suitable manner, although in some instances this pane may be removably secured in the window in the same manner as the removable pane 46.

The removable transparent pane 46 is in opposed relation to the stationary pane 44 whereby a card or other object 48 will be positioned in the frame between the panes for visual inspection from either side of the parking meter.

In order to removably secure and retain the removable pane 46 in the window frame of the device there is provided a securing means in the form of a retaining rim 50 which is of the same shape as the window opening and is adapted to be readily inserted into or withdrawn from the same. This retaining rim may be in the form of a flat band, a wire, or similar element and may be constructed of any suitable material. In order to secure the rim within the window opening of the casing of which the extension 18 consists, there is provided at one end, as for example in the end wall 40 of the frame, a channel, groove or recess 52 with which cooperates a projecting lug or rib 54 carried by one end of the arcuate retaining rim 50. The manner in which this lug cooperates with the seating recess 52 will be clearly apparent from Figure 7. At its other end, the retaining rim is provided with a flattened depressed portion or locking shoulder 56 and a locking means in the form of a locking screw or bolt 58, carried by the end wall 38 of the window frame cooperates with this shoulder for securing the retaining rim in the window opening. In order to facilitate removal of the retaining rim, there is provided an upstanding flange, bracket or lug constituting a finger grip portion 60 which extends outwardly from the retaining rim and exteriorly of the window opening.

The detail view of Figure 9 shows more clearly the construction of that portion of the retainer rim carrying the finger grip portion 60 and the locking shoulder 56.

It will thus be apparent that provision has been made whereby a display card or other article may be easily placed between the two transparent panes of the window opening of the device. Owing to the arcuate shape of the windowing, an unusual length of display space is made available, without however unduly extending the display device laterally of the parking meter head or detracting from the appearance of the latter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A display attachment for parking meters of the type wherein the meter head is provided with a medial external rib extending about the periphery of the meter head, comprising an open-sided frame shaped to closely embrace the entire length of the top and side edges of the parking meter head and having a depending semi-cylindrical lower portion for closely embracing the meter post, means for clamping said lower portion to the meter post, said frame having an open recess for receiving and seating upon one side only of said rib whereby to seat said frame upon the meter head and a display receiving portion upon top of said frame.

2. The combination of claim 1 wherein said display receiving portion comprises a window frame having equidistantly spaced upper and lower edges conforming to the shape of the top of the meter head.

3. The combination of claim 1 wherein the open recess of said display receiving portion comprises a window frame integrally carried by said open sided frame, a transparent pane mounted in said window frame, a removable transparent pane in said window frame and means for securing said removable pane therein.

4. The combination of claim 1 wherein said display receiving portion comprises a window frame, a transparent pane mounted in said window frame, a removable transparent pane in said window frame and means for securing said removable pane therein, said securing means comprising a rib engaging said removable transparent rim, said frame having a recess, said rim having a projecting lug removably seated in said recess, locking means on said frame engaging said rim for retaining the latter in said frame.

References Cited in the file of this patent

UNITED STATES PATENTS

| | | |
|---|---|---|
| 2,027,790 | Schneider | Jan. 14, 1936 |
| 2,554,923 | Reitz | May 29, 1951 |
| 2,600,791 | Mason | June 17, 1952 |
| 2,625,761 | Thompson et al. | Jan. 20, 1953 |
| 2,639,527 | Ezzy et al. | May 26, 1953 |

FOREIGN PATENTS

| | | |
|---|---|---|
| 480,815 | Canada | Feb. 5, 1952 |